United States Patent
Lei (10) Patent No.: US 12,238,637 B2
(45) Date of Patent: Feb. 25, 2025

(54) METHOD AND APPARATUS FOR ACCESS PROCESSING OF USER EQUIPMENT, ELECTRONIC DEVICE, AND COMPUTER STORAGE MEDIUM

(71) Applicant: Tencent Technology (Shenzhen) Company Limited, Guangdong (CN)

(72) Inventor: Yixue Lei, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 203 days.

(21) Appl. No.: 17/449,020

(22) Filed: Sep. 27, 2021

(65) Prior Publication Data

US 2022/0015014 A1 Jan. 13, 2022

Related U.S. Application Data (63) Continuation of application No. PCT/CN2020/115485, filed on Sep. 16, 2020.

(30) Foreign Application Priority Data

Sep. 27, 2019 (CN) .......................... 201910927871.0

(51) Int. Cl.
  *H04W 48/04* (2009.01)
  *H04L 43/08* (2022.01)
  (Continued)

(52) U.S. Cl.
  CPC ......... *H04W 48/04* (2013.01); *H04L 43/0882* (2013.01); *H04W 4/44* (2018.02);
  (Continued)

(58) Field of Classification Search
  None
  See application file for complete search history.

(56) References Cited

U.S. PATENT DOCUMENTS

| 10,206,094 B1 | 2/2019 | Wen et al. |
| 2012/0142352 A1 | 6/2012 | Zhang et al. |
| 2017/0134080 A1* | 5/2017 | Rahman ................ H04L 5/0048 |

FOREIGN PATENT DOCUMENTS

| CN | 102572982 A | * | 7/2012 |
| CN | 102648637 A | | 8/2012 |

(Continued)

OTHER PUBLICATIONS

Supplementary European Search Report issued Oct. 5, 2022 in Application No. 20869052.9, pp. 1-48.

(Continued)

*Primary Examiner* — Yemane Mesfin
*Assistant Examiner* — Jeff Banthrongsack
(74) *Attorney, Agent, or Firm* — ArentFox Schiff LLP (57) ABSTRACT

A method for determining a network access level for a user equipment is provided. In the method, a residence parameter of the user equipment on a target edge computing node of a vehicle-to-everything (V2X) system is obtained. The target edge computing node is one of a plurality of network levels in the V2X system. The one of the plurality of network levels of the target edge computing node is determined as the network access level of the user equipment when the residence parameter meets an access condition of the target edge computing node, so that the user equipment is configured to access a core network of the V2X system through any edge computing node belonging to the determined network access level during movement of the user equipment.

17 Claims, 4 Drawing Sheets

(51) Int. Cl.
　　　*H04L 43/0882*　　(2022.01)
　　　*H04W 4/44*　　　(2018.01)
　　　*H04W 28/08*　　 (2023.01)
　　　*H04W 28/10*　　 (2009.01)
　　　*H04W 36/32*　　 (2009.01)

(52) U.S. Cl.
　　　CPC ... *H04W 28/0838* (2020.05); *H04W 28/0958* (2020.05); *H04W 28/10* (2013.01); *H04W 36/324* (2023.05)

(56) References Cited

FOREIGN PATENT DOCUMENTS

| | | | | |
|---|---|---|---|---|
| CN | 103874149 | A | 6/2014 | |
| CN | 102572982 | B | 9/2014 | |
| CN | 108012295 | A | 5/2018 | |
| CN | 108282801 | A | 7/2018 | |
| CN | 106632813 | A | 10/2018 | |
| JP | 2011166583 | A | 8/2011 | |
| WO | WO2016148399 | A1 * | 9/2016 | ........... G08G 1/0112 |
| WO | WO-2016173644 | A1 * | 11/2016 | |

OTHER PUBLICATIONS

Chinese Office Action dated Mar. 30, 2021 issued in corresponding Chinese patent application No. 201910927871.0 (with English translation).

* cited by examiner

METHOD AND APPARATUS FOR ACCESS PROCESSING OF USER EQUIPMENT, ELECTRONIC DEVICE, AND COMPUTER STORAGE MEDIUM

RELATED APPLICATIONS

This application is a continuation of International Application No. PCT/CN2020/115485, entitled "ACCESS PROCESSING METHOD FOR USER EQUIPMENT, DEVICE, ELECTRONIC APPARATUS, AND COMPUTER STORAGE MEDIUM" and filed on Sep. 16, 2020, which claims priority to Chinese Patent Application No. 201910927871.0, entitled "METHOD FOR ACCESS PROCESSING OF USER EQUIPMENT, INTELLIGENT DEVICE, AND COMPUTER STORAGE MEDIUM" and filed on Sep. 27, 2019. The entire disclosures of the prior applications are hereby incorporated by reference in their entirety.

FIELD OF THE TECHNOLOGY

This disclosure relates to the field of communication technologies, including a method and an apparatus for access processing of a user equipment, an electronic device, and a computer storage medium.

BACKGROUND OF THE DISCLOSURE

Edge computing is a core 5G technology that reduces latency and enables localization management of service data. In a vehicle-to-everything (V2X) communication scenario, the edge computing function can enable access of different network elements (e.g., a user equipment arranged on a vehicle) to a roadside unit (RSU), a gateway node, and a core network in a certain area, thereby implementing low latency data transmission after the user equipment is connected to the core network.

At present, due to a small coverage of the RSU, generally within a range of 200 m to 300 m, when an edge computing node of the vehicle is fixed to the RSU, RSU switching may occur frequently, affecting data exchange between the edge computing node and the user equipment on the vehicle. Consequently, data may not be sent out in time at the switching moment, and a receiving end cannot receive the data, resulting in data loss.

SUMMARY

Embodiments of this disclosure provide a method and an apparatus for access processing of a user equipment, an electronic device, and a computer storage medium to better avoid a problem of untimely data transmission caused by frequent switching. For example, the embodiments include determining a network access level for the user equipment.

According to one aspect, the embodiments of this disclosure provide a method for determining a network access level for a user equipment. In the method, a residence parameter of the user equipment on a target edge computing node of a vehicle-to-everything (V2X) system is obtained. The target edge computing node is one of a plurality of network levels in the V2X system, and the residence parameter indicates at least one of an estimated residence duration of the user equipment accessing the target edge computing node or a message transmission frequency of the user equipment. The one of the plurality of network levels of the target edge computing node is determined as the network access level of the user equipment when the residence parameter meets an access condition of the target edge computing node, so that the user equipment is configured to access a core network of the V2X system through any edge computing node belonging to the determined network access level during movement of the user equipment.

According to another aspect, the embodiments of this disclosure further provide an apparatus. The apparatus includes processing circuitry configured to obtain a residence parameter of a user equipment on a target edge computing node of a vehicle-to-everything (V2X) system. The target edge computing node is one of a plurality of network levels in the V2X system, and the residence parameter indicates at least one of an estimated residence duration of the user equipment accessing the target edge computing node or a message transmission frequency of the user equipment. The processing circuitry is further configured to determine the one of the plurality of network levels of the target edge computing node as the network access level of the user equipment when the residence parameter meets an access condition of the target edge computing node, so that the user equipment is configured to access a core network of the V2X system through any edge computing node belonging to the determined network access level during movement of the user equipment.

According to another aspect, the embodiments of this disclosure further provide an electronic device, including a storage apparatus and a processor; the storage apparatus storing a program instruction; and the processor invoking the program instruction to implement the foregoing method for determining the network access level of the user equipment.

According to another aspect, the embodiments of this disclosure further provide a non-transitory computer-readable storage medium storing instructions which when executed by a processor cause the processor to implement the foregoing method for determining the network access level of the user equipment.

According to another aspect, the embodiments of this disclosure further provide a computer program product or a computer program, including a computer instruction, the computer instruction being stored in a computer-readable storage medium. A processor of a computer device reads the computer instruction from the computer-readable storage medium and executes the computer instruction, so that the computer device performs the foregoing method for access processing of a user equipment.

BRIEF DESCRIPTION OF THE DRAWINGS

To describe the technical solutions of the embodiments of this disclosure more clearly, the following briefly introduces the accompanying drawings required for describing the embodiments. The accompanying drawings in the following description show only some embodiments of this disclosure, and a person of ordinary skill in the art may still derive other drawings from these accompanying drawings.

DESCRIPTION OF EMBODIMENTS

In the embodiments of this disclosure, a V2X system may include a plurality of network levels, and each level is deployed with a plurality of edge computing nodes. The edge computing nodes can directly or indirectly communicate and exchange data with a user equipment arranged on a mobile platform such as a vehicle. On the one hand, relevant data of the mobile platform can be uploaded to a core network through the edge computing nodes at each network level. For example, data such as a speed and a location of the mobile platform on which the user equipment is located is uploaded to the core network. On the other hand, data delivered by the core network, such as information indicating whether there is traffic congestion ahead, or a speed of the mobile platform at an intersection ahead, or other information can be sent to user equipments on mobile platforms through the edge computing nodes at each network level. In this way, it is convenient for the user equipments to remind users or automatically control the movement of the mobile platforms after processing, thereby implementing functions such as an automatic navigation function of avoiding congested routes and a function of avoiding collisions through deceleration in advance.

In addition to vehicles, the mobile platform may include other movable tools, such as other transportation means or mobile platforms. This disclosure is described with vehicles as mobile platforms.

Figure 1:
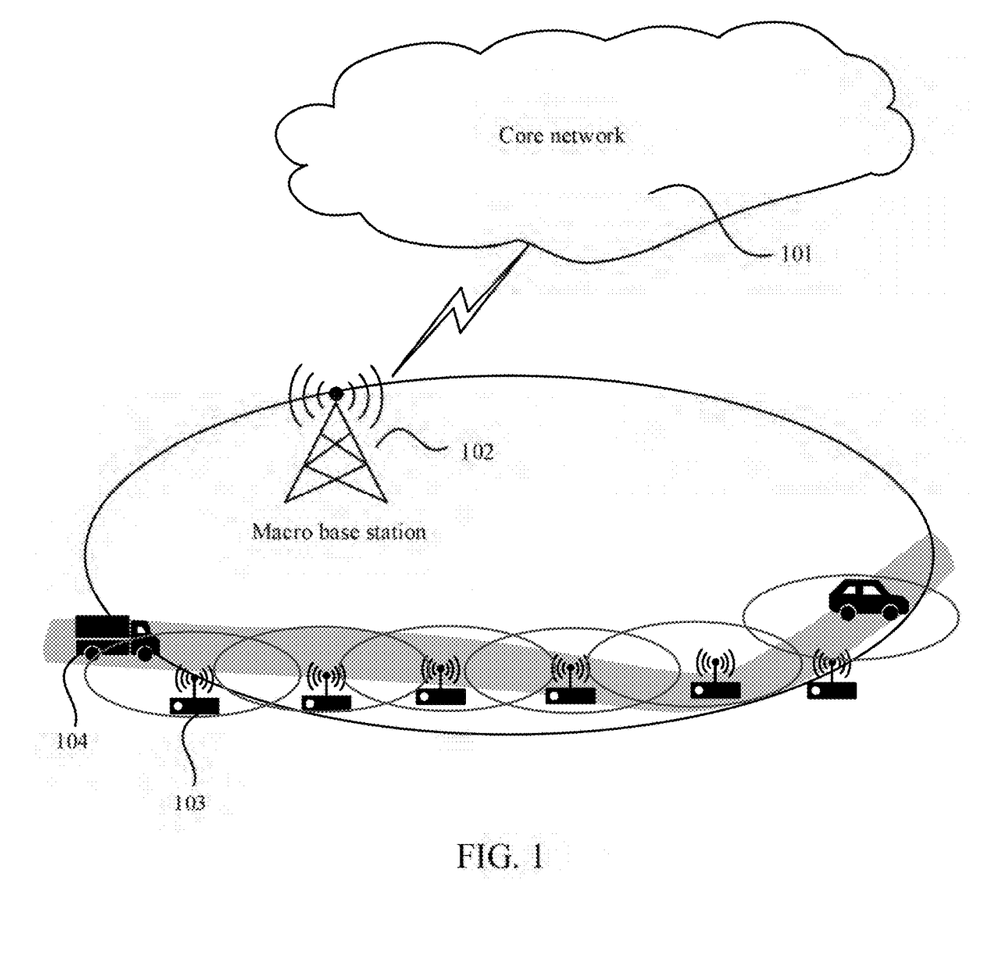
FIG. 1 is an exemplary framework diagram of a V2X system according to an embodiment of this disclosure.

FIG. 1 is an exemplary framework diagram of a V2X system according to an embodiment of this disclosure. The V2X system is a kind of Internet-of-vehicles system. A full name of V2X is Vehicle to Everything, which may be simply understood as the connection between vehicles and other related objects. V2X may include vehicle to vehicle (V2V), vehicle to infrastructure (V21), vehicle to pedestrian (V2P), vehicle to network (V2N), and the like. The V2X system shown in FIG. 1 includes a core network node 101, a macro base station 102 and an RSU 103 in a core network. In some embodiments, a user equipment 104 arranged on a vehicle may also serve as a part of the V2X system. However, the V2X system does not need to include the user equipment 104.

Selection and access of hierarchical edge computing nodes of the embodiments of this disclosure are described below with reference to FIG. 1 and FIG. 2. In FIG. 1, edge computing nodes supporting V2X edge computing are divided into different network levels according to coverage areas, including but not limited to a high network level covering a large range, an intermediate network level covering a certain area, and a low network level.

In FIG. 1, the high network level covering a large range may be, for example, a core network level of the core network. The core network node 101 is included in the core network level.

The intermediate network level covering a certain area may be subdivided into one or more levels based on sizes of the coverage areas as needed. For example, the macro base station 102 in FIG. 1 for connection to a cluster of RSUs 103 may be considered as a first network level and the macro base station 102 may be considered as a gateway node of the first network level. Further, in a larger area, a second network level may also be arranged, and a gateway node of the second network level is configured to manage a cluster of gateway nodes of the first network level in the V2X system. That is, gateway nodes in the second network level may connect and manage a plurality of macro base stations such as the macro base station 102 of the first network level. The intermediate network level may be subdivided into more levels, and the intermediate part of network levels can be increased or decreased, for example, including a third network level. Further, the intermediate network level may include only one network level as shown in FIG. 1 in some embodiments.

The low network level in FIG. 1 is a plurality of RSUs 103 deployed on a road. Each RSU 103 can directly exchange data with a user equipment on a vehicle in the coverage area.

It may be understood that the network level architecture shown in FIG. 1 is merely an example. During actual application, a more complex or simpler level relationship and level nodes may be included.

In an embodiment, gateway nodes at the intermediate network level may be set up based on the macro base station, or only a specific number of low-level nodes can be connected without wireless signal transmission.

In the V2X system, the target edge computing node and other edge computing nodes associated with the target edge computing node may communicate with each other through an X2 interface (a 5G communication interface). That is, RSUs that are associated with each other (e.g., in FIG. 1, when the macro base station 102 is connected to all the RSUs and manages these RSUs, the managed RSUs are associated with each other) can implement rapid context transfer and cooperative interaction through X2 interface connection. Similarly, associated gateway nodes (e.g., macro base stations at the first network level) can also be connected through the X2 interface to implement rapid context transfer and cooperative interaction between user equipments of vehicles. Low-level nodes may be jointly arranged with RSUs or separately deployed.

Figure 2:
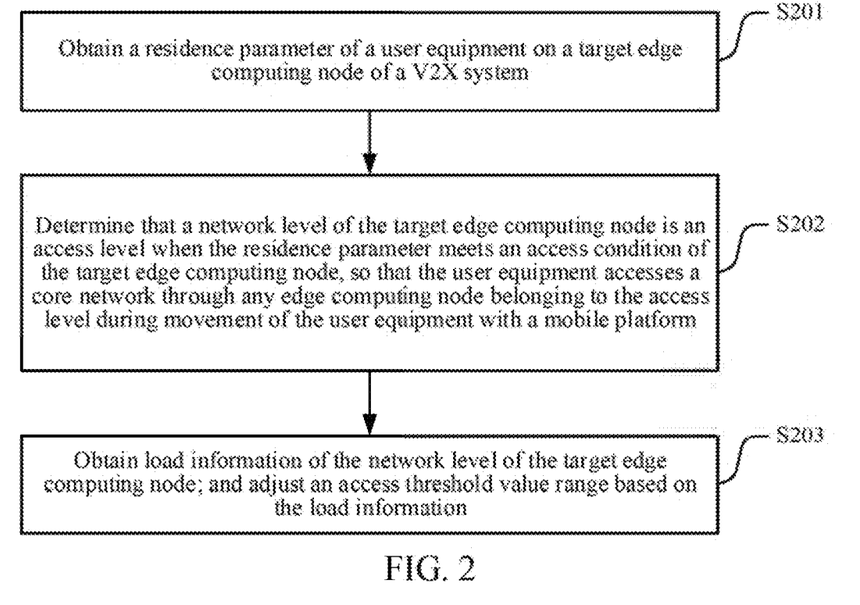
FIG. 2 is an exemplary flowchart of a method for access processing of a user equipment according to an embodiment of this disclosure.

Based on the foregoing V2X system architecture, FIG. 2 is an exemplary flowchart of a method for access processing of a user equipment according to an embodiment of this disclosure. In an embodiment, each edge computing node in the V2X system may perform the method to determine a network level that a user equipment arranged on a vehicle entering the edge computing nodes is to access. The determined network level to be accessed may be referred to as an access level. Subsequently, the user equipment automatically accesses corresponding edge computing nodes included at the access level during movement of the user equipment with the vehicle, and accesses the core network through these edge computing nodes at the access level, to facilitate data uploading or receiving. For example, in FIG. 1, when determining that the low network level is the access level, the user equipment on the vehicle can access the core network through the RSU of the low network level instead of directly accessing the macro base station and accessing the core network through the macro base station.

In another embodiment, the method may alternatively be performed by a dedicated area scheduling device. The area scheduling device is used for managing edge computing nodes of each network level in the V2X system in a certain range area (target area), so as to determine a node at which network level in the V2X system is to be accessed by the user equipment on the vehicle traveling in the target area. In another embodiment, the method may alternatively be performed by the user equipment. The user equipment determines, based on an obtained residence parameter, which network level of an edge computing node in the V2X system is to be accessed.

In an embodiment, the residence parameter includes a statistical parameter used for describing the process of the user equipment staying in the wireless coverage area served by an edge computing node. For example, the residence parameter includes a parameter obtained, while the user equipment is in the wireless coverage area served by an edge computing node, through statistics collection based on a large amount of residence data of the user equipment in the wireless coverage area of the edge computing node, for example, a statistical parameter such as an estimated residence duration can be obtained through statistics collection based on a residence time, and a message transmission frequency.

FIG. 2 is an exemplary flowchart of a method for access processing of a user equipment according to an embodiment of this disclosure. The method may be performed by any target edge computing node (e.g., the core network node 101, the macro base station 102, and the RSU 103 shown in FIG. 1 respectively corresponding to the three network levels), or a dedicated area scheduling device, or a user equipment during vehicle travel. The method can include the following steps:

In step S201, a residence parameter of the user equipment can be obtained on a target edge computing node of a V2X system The user equipment is arranged on a mobile platform such as a vehicle, and the target edge computing node is a node at any network level in the V2X system. For example, the target edge computing node is an RSU in the V2X system, the target edge computing node is a gateway node at a first network level for connection to a cluster of RSUs in the V2X system, the target edge computing node is a gateway node at a second network level for connection to a cluster of gateway nodes at a first network level in the V2X system, or the target edge computing node is a core network node at a core network level in the V2X system.

The residence parameter includes an estimated residence duration of the user equipment accessing the target edge computing node, a message transmission frequency for the user equipment, or the estimated residence duration of the user equipment accessing the target edge computing node and the message transmission frequency for the user equipment.

In an embodiment, the estimated residence duration is obtained through statistics collection based on historical residence data reported by a plurality of user equipments arranged on the mobile platform after accessing the target edge computing node at different times or different speeds or with other different factors. These user equipments refer to devices that have accessed the target edge computing node. For example, based on the historical residence data reported by historical user equipments, estimated residence durations of the user equipments on the target edge computing node for different speeds and other factors are obtained through statistics collection.

For example, the historical residence data includes a historical residence duration on the target edge computing node, a running speed of the vehicle, and other data, so as to determine the estimated residence duration corresponding to the target edge computing node. For each edge computing node in the V2X system, the historical residence data of user equipments on different vehicles may be used for obtaining expected residence durations corresponding to user equipments on RSUs in different areas, gateway nodes serving a cluster of RSUs, core network nodes, and other nodes, that is, the estimated residence duration, which may be denoted as T.

In an embodiment, an estimated residence duration can be obtained through statistics collection based on historical residence durations of a large number of user equipments and vehicles thereof that have accessed RSUs, gateway nodes, and core network nodes arranged in each position area. For example, the estimated residence duration may be an average of the historical residence durations. For the user equipment on each vehicle, the estimated residence duration obtained through statistics collection can be directly used for an edge computing node at a certain network level.

In an embodiment, the estimated residence duration of a vehicle in different speed ranges may alternatively be obtained through statistics collection based on historical data including speeds and historical residence durations of a large number of user equipments and vehicles thereof that have accessed RSUs, gateway nodes, and core network nodes arranged in each position area. For example, an average of historical residence durations obtained through statistics collection at speeds above 100 km/h is calculated, and the estimated residence duration of a vehicle with a speed of 100 km/h is predicted; and an average of historical residence durations obtained through statistics collection at speeds between 80 km/h to 99 km/h is calculated, and the estimated residence duration of a vehicle with a speed between 80 km/h to 99 km/h is predicted. By analogy, an estimated residence duration corresponding to a vehicle of a corresponding speed can be subsequently determined based on each speed range obtained through the prediction.

The message transmission frequency includes a message pushing frequency of an application layer service of the user equipment on the vehicle, and for example, may include any one of a frequency of sending a V2X message by the user equipment, a frequency of receiving a V2X message by the user equipment, a frequency of pushing a V2X message by the target edge computing node, and a frequency of receiving a V2X message by the target edge computing node. The message transmission frequency is denoted as C. The message transmission frequency may be measured by the number of messages per unit time. For example, if a message is sent at 10 Hz. C is 10.

A higher frequency of sending messages indicates a smaller tolerance for switching and interruption. Therefore, edge computing nodes with high levels are to be selected. The message transmission frequency may be a statistical standard frequency, which may be preset or may be reported by the user equipment or the edge computing node.

After obtaining the residence parameter, it is required to determine whether the user equipment of the vehicle accesses the network level of the target edge computing node. That is, it is required to determine the access level of the user equipment of the vehicle.

In step S202, a network level of the target edge computing node is determined as an access level when the residence parameter meets an access condition of the target edge computing node, so that the user equipment accesses a core network through any edge computing node belonging to the access level during movement of the user equipment with the mobile platform.

That is, in S202, an appropriate network level is selected to access the core network based on a residence parameter such as an estimated residence duration and a message transmission frequency. An access condition may be set for a network level, and all edge computing nodes at the network level correspond to the access condition. The residence parameter meets the access condition of the target edge computing node. That is, the residence parameter meets the access condition of the network level of the target edge computing node.

In an embodiment, when the residence parameter includes the estimated residence duration and the message transmission frequency, that the residence parameter meets the access condition includes: a ratio of the estimated residence duration included in the residence parameter to the message transmission frequency included in the residence parameter falls within an access threshold range, the access threshold range being set for the network level of the target edge computing node. That is, different network levels are selected when values of C/T fall in different value intervals.

In an embodiment, a vehicle with a small C/T value may select a low level. A vehicle with a low speed, or a vehicle that stops at the road side with a relatively large T value, or a vehicle with a low message pushing frequency may directly select the lowest level, such as the network level of the RSU 103 in FIG. 1, to access as an access level. A vehicle with a large C/T value may select a higher level. For example, a vehicle with a high message pushing frequency and a small T value may select the network level of the macro base station 102 in FIG. 1 as an access level, or even a network level that is one level higher.

In an embodiment, the target edge computing node is an RSU in the V2X system, the target edge computing node is a gateway node at a first network level for connection to a cluster of RSUs in the V2X system, the target edge computing node is a gateway node at a second network level for connection to a cluster of gateway nodes of a first network level in the V2X system, or the target edge computing node is a core network node of a core network level in the V2X system. Alternatively, it may be understood that when a vehicle passes through an area, it is required to perform processing in the foregoing S201 and S202 on the edge computing nodes of each network level in the V2X system of the area, so as to determine a network level of the V2X system through which the user equipment of the vehicle is to access the core network.

In some cases, for example, for some areas with better traffic conditions, vehicle speeds are generally fast and the estimated residence duration is relatively short. In these cases, it may occur that only a higher network level or a high network level serves as the access level through the foregoing S201 and S202.

For example, on a straight road, user equipments of vehicles may all access the macro base station 102 shown in FIG. 1, which may lead to higher load on each edge computing node in the network level of the macro base station 102 in this area, and data is required to be exchanged with user equipments on more vehicles.

Therefore, in an embodiment, the method can further optimize the access condition based on the load information, specifically including step S203 in which the load information of the network level of the target edge computing node is obtained, and the access threshold range is adjusted based on the load information. When the load is high, the access threshold range can be reduced, thereby expanding a threshold for accessing the edge computing nodes, and helping reduce the load. It may be understood that step S203 is merely exemplary, and the load of each edge computing node in the network level may not need to be adjusted during all implementations.

The foregoing description mentions using the load information of the network level of the target edge computing node to adjust the access condition of the network level, so as to avoid excessive load at the network level. It may be mainly considered that the access condition of the specific network level is optimized after the user equipment uses the network level of the target edge computing node as the access level. As the load of the corresponding network level changes due to the access of the user equipment, it is necessary to optimize and adjust the access condition.

In another embodiment, the load information of each network level in the V2X system may alternatively be obtained at an appropriate time, such as according to a certain adjustment period or in real time. The access condition of each network level may be optimized based on the load information of each network level. In this way, each time a network level needs to be selected for any user equipment, there is an access condition configured based on the load information of the network level of the whole V2X system. This can well avoid a problem of uneven load caused by relatively large load of some of the network levels and small or even empty load of other network levels. To some extent, access of the user equipment to a relatively suitable network level can be ensured, and load of the network levels in the V2X system can be better balanced, thereby meeting a requirement of load balancing.

In another embodiment, the access condition of each network level may alternatively be adjusted for a user equipment according to requirements of electronic resources. That is, each network level in the V2X system is configured with resource information, and the resource information may refer to cost information, that is, costs to be paid by the user equipment to receive the service of the V2X system. The cost information may be set based on network resources at the network level. For example, the cost information between wired network resources (e.g., optical fiber resources or copper wire resources) and wireless network resources is different. If different network resources are used at the network level, the cost information indicates different costs.

The resource information may alternatively directly refer to network resources. With different network resources, access conditions are different. In an embodiment, an access condition of a network level at which wireless network resources are used is different from an access condition of a network level at which wired network resources are used. For example, an access threshold of a network level at which wireless network resources are used is lower than an access threshold of a network level at which wired network resources are used.

After determining resource information of each network level, the method may further include: configuring an access condition of the each network level for the user equipment based on the resource information of the each network level. The cost information corresponding to the resource information can be construed as the cost to be paid during electronic payment by the user equipment when receiving a service of the V2X system, or the virtual currency that needs to be paid, such as token resources such as Bitcoin. The access condition of the each network level may be dynamically adjusted for the user equipment by further referring to an electronic resource balance of a payment account corresponding to the user equipment, so that the user equipment can better enjoy a V2X service.

For example, if the balance of the user equipment is relatively low, when the cost of the low network level is low, an access condition for the low network level is lowered for the user equipment (e.g., the access threshold range is adjusted to make the range larger or a starting value of the range smaller, or both the access threshold range (is increased) and the range starting value (is decreased) are adjusted to lower the access threshold to the low network levels), or also or only an access condition for high network levels is raised (e.g., the access threshold range is adjusted to make the range smaller, or the starting value of the range larger, or both the access threshold range (is decreased) and the starting value of the range (is increased) are adjusted to increase the access threshold to the high network levels), thereby avoiding excessive consumption of electronic resources by the user equipment. On the contrary, in order to provide users with better V2X services, if the user equipment determines permission is provided, when the balance of the user equipment is relatively high, the access condition for the low network levels is increased (e.g., the access threshold is increased), or the access condition for the high network levels may also or only be lowered (e.g., the access threshold is lowered).

In an embodiment, on the one hand, the access condition (e.g., the access threshold range) of each network level in the V2X system may be adjusted based on the load information. Before or after the access of the user equipment, the access condition of the each network level may be adjusted. In other words, the access condition of a certain user equipment may be comprehensively adjusted based on resource information and load information, that is, both the load and the electronic resource balance of the payment account corresponding to the user equipment are considered. On the other hand, the load information and resource information may be comprehensively utilized to select a final access level for the current user equipment.

For example, the resource information configured for the RSU network level is a first electronic resource, the resource information configured for the first network level is a second electronic resource, the resource information configured for the second network level is a third electronic resource, and the resource information configured for the core network level is a fourth electronic resource. The first electronic resource is smaller than the second electronic resource, which is smaller than the third electronic resource, which is smaller than the fourth electronic resource. A greater resource demand indicates a better service provided. If the balance on the payment account corresponding to the user equipment is sufficient, and a user does not set the access level, the network level that consumes more resources but can provide a better service is preferentially selected. For example, based on the residence parameter of the user equipment, when it is determined that the user can access the first network level and the second network level, access to the second network level is preferentially selected if the balance on the payment account is sufficient. On the contrary, if the balance is low, access to the first network level is preferentially selected.

Similarly, for example, when it is determined, based on the residence parameter of the user equipment, that the user can access the second network level and the third network level, if the electronic resource balance corresponding to the user equipment is low, access to the first network level with low load or less resource information is preferentially selected. In this embodiment of this disclosure, the high load, the low load, the high electronic resource balance, and the low electronic resource balance indicated by the load information may be set in a plurality of combinations as needed, to meet the requirements set based on different user resources and network load.

In an embodiment, specifically, the load information of the network level of the target edge computing node may be obtained; and the access threshold range may be adjusted based on the load information, so as to optimize the access condition.

The access threshold range is reduced if a load amount indicated by the load information is greater than a load amount threshold.

Alternatively, a starting value of the access threshold range is increased if a load amount indicated by the load information is greater than a load amount threshold.

To implement load balancing, the access threshold range of C/T may be dynamically adjusted so that vehicles with different speeds and message transmission frequencies are at different network levels and access the core network through the different network levels, including but not limited to accessing the core network through the network level of the accessed edge computing nodes.

In this embodiment of this disclosure, relevant data of the user equipment on the vehicle that resides on edge computing nodes of different levels can be collected, to determine, using this as an evaluation basis, the level of the V2X system suitable for the user equipment to access. The method can not only meet the data exchange between the user equipment and corresponding nodes in the V2X system, and facilitate the data exchange between the user equipment and a network, but also can effectively avoid the problem of untimely data transmission caused by frequent switching.

Figure 3:
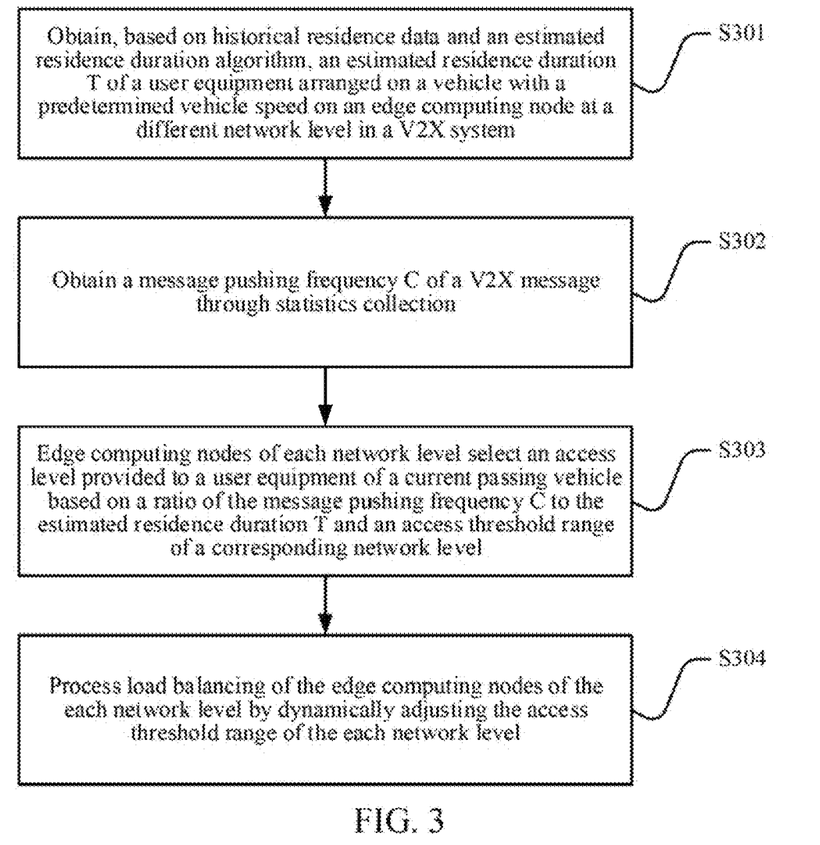
FIG. 3 is an exemplary flowchart of another method for access processing of a user equipment according to an embodiment of this disclosure.

FIG. 3 is an exemplary flowchart of another method for access processing of a user equipment according to an embodiment of this disclosure. The method may be performed by any target edge computing node (e.g., the core network node 101, the macro base station 102, and the RSU 103 shown in FIG. 1 respectively corresponding to the three network levels), or a dedicated area scheduling device, or a user equipment. In this embodiment of this disclosure, a process from information configuration to access of the user equipment is described. The method can include the following steps:

In step S301, based on historical residence data and an estimated residence duration algorithm, an estimated residence duration T of a user equipment arranged on a vehicle with a predetermined vehicle speed on an edge computing node at a different network level in a V2X system is obtained.

For example, in FIG. 1, in the RSU 103 and the macro base station 102, estimated residence durations of corresponding user equipments on a large number of vehicles in the RSU 103 and the macro base station 102 at a certain vehicle speed can be calculated successively, and the estimated residence duration obtained through statistics collection can be configured in the RSU 103 and the macro base station 102. The estimated residence duration may be updated in real time or in accordance with a preset update period.

In step S302, a message pushing frequency C of a V2X message is obtained through statistics collection.

The message pushing frequency is one type of message transmission frequencies. In this embodiment of this disclosure, the message pushing frequency is mainly used for collecting statistics about a frequency of pushing messages to user equipments on passing vehicles by the RSU 103 and the macro base station 102 in FIG. 1. For example, if a pushing frequency is 10 Hz, the message pushing frequency of the V2X message is 10. The message pushing frequency may be a fixed value, or may be data updated in real time or periodically and obtained through statistics collection during pushing of messages to user equipments on a large number of passing vehicles.

In step S303, edge computing nodes of each network level select an access level provided to a user equipment of a current passing vehicle based on a ratio of the message pushing frequency C to the estimated residence duration T and an access threshold range of a corresponding network level.

It may be understood that, in this embodiment of this disclosure, the message pushing frequency is positively correlated, that is, a higher pushing frequency indicates easier stay of the user equipment at the network level of the target edge computing node (e.g., the RSU 103 and the macro base station 102). On the contrary, the estimated residence duration is negatively correlated, that is, a longer estimated residence duration indicates easier stay of the user equipment at the network level of the target edge computing node (e.g., the RSU 103 and the macro base station 102).

Based on this, in other embodiments, alternatively, the ratio of the message pushing frequency to the estimated residence duration may not be calculated. Instead, reference data may be obtained through other calculation methods, and an access level is selected for a user equipment of a current passing vehicle with the reference data as reference information.

In step S304, load balancing of the edge computing nodes of the each network level is processed by dynamically adjusting the access threshold range of the each network level.

In an embodiment, when a network level has high load, that is, when a large number of user equipments are accessed, the access threshold range of the network level may be reduced, and an access threshold may be raised, so that the load is reduced. When a network level has low load, that is, when a small number of user equipments are accessed, the access threshold range of the network level may be raised, and the access threshold may be lowered, so that the load is increased.

Similarly, steps S301 to S304 may be performed by one or more edge computing nodes, such as the RSU 103 and the macro base station 102. Alternatively, the steps may be performed by a dedicated device or server, and a message pushing frequency and an estimated residence duration obtained through statistics collection are configured in edge computing nodes such as the RSU 103 and the macro base station 102. Alternatively, the steps may be performed by a dedicated device or server, and edge computing nodes of different network levels in a configured area are managed based on a message pushing frequency and an estimated residence duration obtained through statistics collection, to configure an access network for user equipments on vehicles passing through the area.

In this embodiment of this disclosure, relevant data of the user equipment on the vehicle that resides on edge computing nodes of different levels can be collected, to determine, using this as an evaluation basis, the level of the V2X system suitable for the user equipment to access. The method can not only meet the data exchange between the user equipment and corresponding nodes in the V2X system, and facilitate the data exchange between the user equipment and a network, but also can effectively avoid the problem of untimely data transmission caused by frequent switching.

Figure 4:
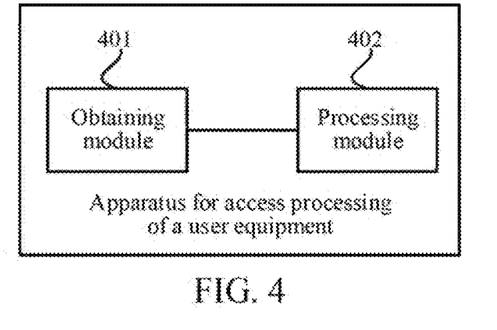
FIG. 4 is an exemplary structural diagram of an apparatus for access processing of a user equipment according to an embodiment of this disclosure.

FIG. 4 is an exemplary structural diagram of an apparatus for access processing of a user equipment according to an embodiment of this disclosure. The apparatus in this embodiment of this disclosure may be arranged on an edge computing node in a V2X system, such as the core network node 101, the macro base station 102, and the RSU 103 shown in FIG. 1 respectively corresponding to the three network levels; may be arranged in a dedicated area scheduling device configured to manage edge computing nodes at each network level in the V2X system in a certain range area (target area); or arranged in a user equipment that can be mounted on a mobile platform such as a vehicle. The apparatus may include an obtaining module 401 and a processing module 402. One or more of modules, submodules, and/or units of the apparatus can be implemented by processing circuitry, software, or a combination thereof, for example.

The obtaining module 401 is configured to obtain a residence parameter of the user equipment on a target edge computing node of a V2X system, the user equipment being arranged on a mobile platform, the target edge computing node being a node at any network level in the V2X system, and the residence parameter including an estimated residence duration of the user equipment accessing the target edge computing node and/or a message transmission frequency for the user equipment.

The processing module 402 is configured to determine that a network level of the target edge computing node is an access level when the residence parameter meets an access condition of the target edge computing node, so that the user equipment accesses a core network through any edge computing node belonging to the access level during movement of the user equipment with the mobile platform.

In an embodiment, when the residence parameter includes the estimated residence duration and the message transmission frequency, that the residence parameter meets the access condition of the target edge computing node includes: a ratio of the estimated residence duration to the message transmission frequency falls within an access threshold range, the access threshold range being set for the network level of the target edge computing node.

In an embodiment, the estimated residence duration is obtained through statistics collection based on historical residence data reported by a plurality of user equipments arranged on the mobile platform after accessing the target edge computing node.

In an embodiment, the message transmission frequency includes any one of: a frequency of sending a V2X message by the user equipment, a frequency of receiving a V2X message by the user equipment, a frequency of pushing a V2X message by the target edge computing node, and a frequency of receiving a V2X message by the target edge computing node.

In an embodiment, the target edge computing node is an RSU in the V2X system, the target edge computing node is a gateway node at a first network level for connection to a cluster of RSUs in the V2X system, the target edge computing node is a gateway node at a second network level for connection to a cluster of gateway nodes at the first network level in the V2X system, or the target edge computing node is a core network node at a core network level in the V2X system.

In an embodiment, in the V2X system, the target edge computing node and other edge computing nodes associated with the target edge computing node communicate with each other through an X2 interface.

In an embodiment, the obtaining module 401 is further configured to obtain load information of each network level in the V2X system. The processing module 402 is further configured to optimize the access condition of the each network level based on the load information of the each network level.

In an embodiment, each network level in the V2X system is configured with resource information, and the processing module 402 is further configured to configure an access condition of each network level for the user equipment based on the resource information of each network level.

In an embodiment, the obtaining module 401 is further configured to obtain the load information of the network level of the target edge computing node. The processing module 402 is further configured to adjust the access threshold range based on the load information.

In an embodiment, the processing module 402 is configured to reduce the access threshold range when a load amount indicated by the load information is greater than a load amount threshold; otherwise, expand the access threshold value.

In an embodiment, the processing module 402 is configured to increase the starting value of the access threshold range when a load amount indicated by the load information is greater than a load amount threshold; otherwise, decrease the starting value of the access threshold range.

For exemplary implementations of the foregoing modules according to this embodiment of this disclosure, refer to the description of corresponding content in the foregoing embodiments. Details are not repeated herein.

In this embodiment of this disclosure, relevant data of the user equipment on the vehicle that resides on edge computing nodes of different levels can be collected, to determine, using this as an evaluation basis, the level of the V2X system suitable for the user equipment to access. The method can not only meet the data exchange between the user equipment and corresponding nodes in the V2X system, and facilitate the data exchange between the user equipment and a network, but also can effectively avoid the problem of untimely data transmission caused by frequent switching.

Figure 5:
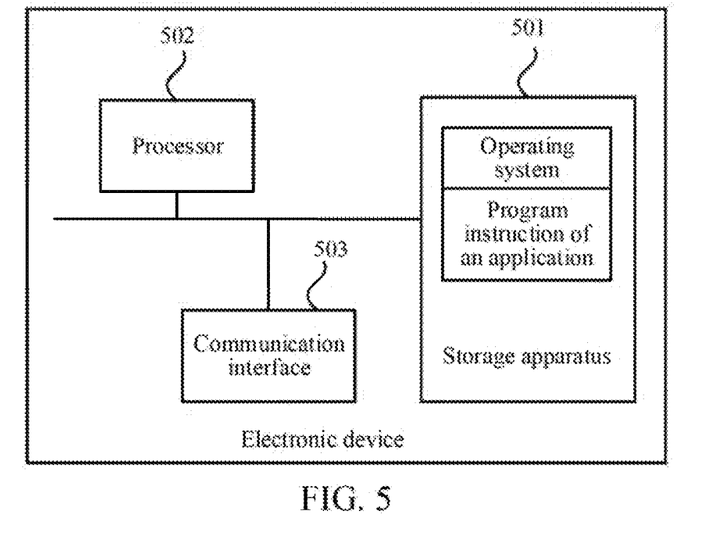
FIG. 5 is an exemplary structural diagram of an electronic device according to an embodiment of this disclosure.

FIG. 5 is an exemplary structural diagram of an electronic device according to an embodiment of this disclosure. The electronic device of this embodiment of this disclosure includes a storage apparatus 501, a processor 502, and a communication interface 503. Further, the electronic device may include a power module, a user interface including a touch display screen, a physical key and other components, a network interface, and other structures as required in some embodiments. Further, the electronic device may also include a speaker, a microphone, and other components in some embodiments.

The communication interface 503 may be a 5G communication-based interface. The storage apparatus 501 may include a volatile memory such as a random-access memory (RAM). The storage apparatus 501 may alternatively include a non-volatile memory such as a flash memory or a solid-state drive (SSD). The storage apparatus 501 may alternatively include a combination of the foregoing types of memories.

The processor 502 may be processing circuitry such as a central processing unit (CPU) 502. The processor 502 may further include a hardware chip. The foregoing hardware chip may be an application-specific integrated circuit (ASIC), a programmable logic device (PLD), or the like. The PLD may be a field-programmable gate array (FPGA), a generic array logic (GAL), or the like.

In some embodiments, the storage apparatus 501 is further configured to store a program instruction. The processor 502 may invoke the program instruction to implement the method for access processing of a user equipment shown in the embodiment of FIG. 2 in this disclosure.

In an embodiment, the processor 502 invokes the target program instruction to obtain a residence parameter of the user equipment on a target edge computing node of a V2X system. The user equipment is arranged on a mobile platform, the target edge computing node is a node at any network level in the V2X system, and the residence parameter includes an estimated residence duration of the user equipment accessing the target edge computing node and/or a message transmission frequency for the user equipment. The processor determines that a network level of the target edge computing node is an access level when the residence parameter meets an access condition of the target edge computing node, so that the user equipment accesses a core network through any edge computing node belonging to the access level during movement of the user equipment with the mobile platform.

For exemplary implementations of the foregoing modules according to this embodiment of this disclosure, refer to the description of corresponding content in the foregoing embodiments. Details are not repeated herein.

In this embodiment of this disclosure, relevant data of the user equipment on the vehicle that resides on edge computing nodes of different levels can be collected, to determine, using this as an evaluation basis, the level of the V2X system suitable for the user equipment to access. The method can not only meet the data exchange between the user equipment and corresponding nodes in the V2X system, and facilitate the data exchange between the user equipment and a network, but also can effectively avoid the problem of untimely data transmission caused by frequent switching.

A person of ordinary skill in the art may understand that all or some of the procedures of the methods of the foregoing embodiments may be implemented by a computer program instructing relevant hardware. The program may be stored in a computer-readable storage medium such as a non-transitory computer-readable storage medium. When the program is executed, the procedures of the foregoing embodiments of the method for access processing of a user equipment may be implemented. The foregoing storage medium may be a magnetic disc, an optical disc, a read-only memory (ROM), a random access memory (RAM), or the like.

The foregoing descriptions are merely some embodiments of this disclosure, and are not intended to limit the scope of this disclosure. A person of ordinary skill in the art may understand all or some processes of the foregoing embodiments, and equivalent modifications made according to the claims of this disclosure shall still fall within the scope of this disclosure.

What is claimed is:

1. A method for determining a network access level for a user equipment, the method performed by the user equipment and comprising:

obtaining residence parameter information of the user equipment on a target edge computing node of a vehicle-to-everything (V2X) system including a plurality of network levels, the residence parameter information including a ratio of an estimated residence duration of the user equipment accessing the target edge computing node and a message transmission frequency of the user equipment; and determining, by processing circuitry in the user equipment, one of the plurality of network levels that is a network level of the target edge computing node as a network access level of the user equipment when the ratio of the estimated residence duration and the message transmission frequency is within an access threshold range, the user equipment being configured to access a core network of the V2X system through an edge computing node belonging to the determined network access level during movement of the user equipment, wherein the target edge computing node is one of a roadside unit (RSU) in the V2X system, a gateway node of a first network level in the V2X system configured to connect with a cluster of road side units, a gateway node at a second network level in the V2X system for connection to a cluster of gateway nodes at the first network level, and a core network node at a core network level in the V2X system.

2. The method according to claim 1, wherein
the access threshold range is set for the network level of the target edge computing node.

3. The method according to claim 2, further comprising:
obtaining load information of the network level of the target edge computing node; and
adjusting the access threshold range based on the load information.

4. The method according to claim 3, wherein the adjusting the access threshold range comprises:
reducing the access threshold range when a load amount indicated by the load information is greater than a load amount threshold.

5. The method according to claim 3, wherein the adjusting the access threshold range comprises:
increasing a starting value of the access threshold range when a load amount indicated by the load information is greater than a load amount threshold.

6. The method according to claim 1, wherein the estimated residence duration is obtained through statistics collection based on historical residence data reported by a plurality of user equipments after accessing the target edge computing node.

7. The method according to claim 1, wherein the message transmission frequency indicates one of a frequency of transmitting V2X messages by the user equipment, a frequency of receiving the V2X messages by the user equipment, a frequency of pushing the V2X messages by the target edge computing node, and a frequency of receiving the V2X messages by the target edge computing node.

8. The method according to claim 1, wherein the target edge computing node and other edge computing nodes associated with the target edge computing node communicate with each other through an X2 interface in the V2X system.

9. An apparatus in a user equipment, comprising:
processing circuitry configured to:
obtain residence parameter information of the user equipment on a target edge computing node of a vehicle-to-everything (V2X) system including a plurality of network levels, the residence parameter information including a ratio of an estimated residence duration of the user equipment accessing the target edge computing node and a message transmission frequency of the user equipment; and
determine one of the plurality of network levels that is a network level of the target edge computing node as a network access level of the user equipment when the ratio of the estimated residence duration and the message transmission frequency is within an access threshold range, the user equipment being configured to access a core network of the V2X system through an edge computing node belonging to the determined network access level during movement of the user equipment, wherein
the target edge computing node is one of a roadside unit (RSU) in the V2X system, a gateway node of a first network level in the V2X system configured to connect with a cluster of road side units, a gateway node at a second network level in the V2X system for connection to a cluster of gateway nodes at the first network level, and a core network node at a core network level in the V2X system.

10. The apparatus according to claim 9, wherein
the access threshold range is set for the network level of the target edge computing node.

11. The apparatus according to claim 10, wherein the processing circuitry is configured to:
obtain load information of the network level of the target edge computing node; and
adjust the access threshold range based on the load information.

12. The apparatus according to claim 11, wherein the processing circuitry is configured to:
reduce the access threshold range when a load amount indicated by the load information is greater than a load amount threshold.

13. The apparatus according to claim 11, wherein the processing circuitry is configured to:
increase a starting value of the access threshold range when a load amount indicated by the load information is greater than a load amount threshold.

14. The apparatus according to claim 9, wherein the estimated residence duration is obtained through statistics collection based on historical residence data reported by a plurality of user equipments after accessing the target edge computing node.

15. The apparatus according to claim 9, wherein the message transmission frequency indicates one of a frequency of transmitting V2X messages by the user equipment, a frequency of receiving the V2X messages by the user equipment, a frequency of pushing the V2X messages by the target edge computing node, and a frequency of receiving the V2X messages by the target edge computing node.

16. The apparatus according to claim 9, wherein the target edge computing node and other edge computing nodes associated with the target edge computing node communicate with each other through an X2 interface in the V2X system.

17. A non-transitory computer-readable storage medium, storing instructions which when executed by a processor of a user equipment cause the processor to perform:
obtaining residence parameter information of the user equipment on a target edge computing node of a vehicle-to-everything (V2X) system including a plurality of network levels, the residence parameter information including a ratio of an estimated residence duration of the user equipment accessing the target edge computing node and a message transmission frequency of the user equipment; and
determining one of the plurality of network levels as a network access level of the user equipment when the ratio of the estimated residence duration and the message transmission frequency is within an access threshold range, the user equipment being configured to access a core network of the V2X system through an edge computing node belonging to the determined network access level during movement of the user equipment, wherein
the target edge computing node is one of a roadside unit (RSU) in the V2X system, a gateway node of a first network level in the V2X system configured to connect with a cluster of road side units, a gateway node at a second network level in the V2X system for connection to a cluster of gateway nodes at the first network level, and a core network node at a core network level in the V2X system.

\* \* \* \* \*